Patented July 1, 1930

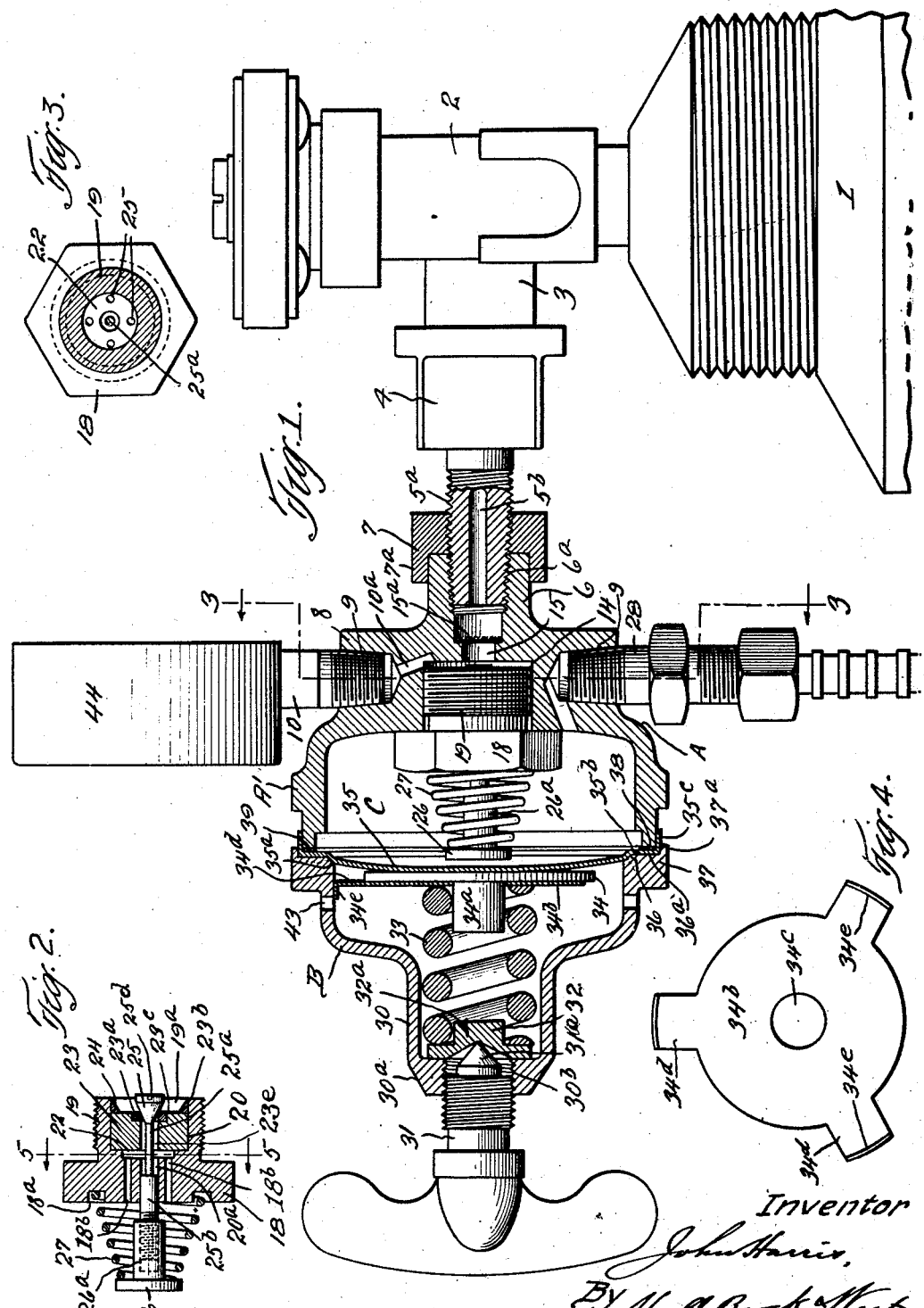

1,768,904

UNITED STATES PATENT OFFICE

JOHN HARRIS, OF CLEVELAND, OHIO, ASSIGNOR TO THE HARRIS CALORIFIC COMPANY, OF CLEVELAND, OHIO, A CORPORATION OF OHIO

REGULATOR

Application filed September 12, 1925. Serial No. 55,988.

This invention relates to regulators for gases, and more particularly to regulators of the type employed for the handling of gases which are dispensed in cylinders, under high pressure, instances of such gases being oxygen, carbon dioxide, nitrous oxide, ethylene, cutting and welding gases, certain of my improvements being particularly adapted for the handling of gases which are dispensed in liquefied form.

It is the general purpose and object of the invention to improve the means for unseating the valves of regulators of the foregoing type.

I accomplish the foregoing object in and through the construction and arrangement of parts shown in the drawings, wherein Fig. 1 represents a central sectional elevation through a regulator constructed in accordance with my invention, showing the gauge mounting and the top of the cylinder or tank in elevation; Fig. 2, a detail in vertical longitudinal section through the valve mounting, the valve proper and stem being shown in elevation; Fig. 3, a detail in section corresponding to the line 5—5 of Fig. 2; and Fig. 4, a detail in elevation of the guide plate for the diaphragm backing member.

Describing the various parts by reference characters, 1 denotes the supply tank, which may contain any gas the pressure of which is to be regulated. This tank is provided at its upper end with the usual valve having a casing 2, said valve serving to control or cut off the flow of gas from the tank to the outlet connection 3. Secured to the connection 3, as by a gland nut 4, is the adjacent end of a delivery connection 5. The delivery portion of the connection 5 is threaded, as indicated at 5ª, and the end of such threaded portion is tapered whereby it is threaded into a correspondingly tapered seat 6ª within the outer portion of the bore of the regulator connection 6. 7 denotes a lock nut which is threaded upon the portion 5ª of the connection 5 and which is provided with a sleeve 7ª which is adapted to fit closely about the outer surface of the adjacent end of the connection 6. The tapered connection between the part 5ª and the part 6ª enables a tight connection to be made between these parts, and the nut 7 not only locks the parts against unintentional loosening or separation, but also resists any tendency of the parts so connected to rock or twist. Furthermore, the sleeve 7ª prevents the expansion of the outer end of the connection 6 by the pressure of the gas therein, thereby preventing escape of the gas as well as preventing injury to the connections 5 and 6.

The connection 6 is shown as formed with the combined end cap section A and body section A' of the regulator. The connection merges with a thick cylindrical boss 8 constituting the back of the section A.

This back is provided with a plurality of radial bores 9, two of which bores are threaded for the reception of the nipples for the high and low pressure gauges, both of which may be mounted in a common casing 44, and the nipple 10 for the high pressure gauge communicates by the port 10ª with the back of a valve chamber 14 which is provided in front of the bore 15 which connects the passage 5ᵇ with a regulator body. The bore 15 is provided with a strainer 15ª to prevent any sediment in the gas from entering the chamber 14.

Threaded into the chamber 14 is a valve body, the same having at its inner end a hexagonal head 18 and being provided with a cylindrical body 19 which is threaded into said chamber. This body is provided with a cylindrical chamber 20 in its outer end and with a reduced central guide port 20ª extending from said chamber through said head; also with a plurality of passages 18ᵇ surrounding the bore 20ª and communicating at their outer ends with a chamber 22 extending inwardly from the larger chamber 20.

23 denotes a valve seat block which is of metal, preferably brass, and which is fitted within the inner end of the chamber 20 and is provided with a central bore 23ᵉ, preferably of the same diameter as the bore 20ª and adapted to discharge into the chamber 22. The rear face of the block 23 is provided with an annular recess 23ᶜ surrounding the outer or rear end of the bore 23ᵉ. This recess is preferably from $\frac{1}{64}$ inch to $\frac{1}{32}$ inch in depth and is filled with tin, to provide a soft-metal valve seat 23ª. The joint formed between the rear peripheral portion of the block 23 and the adjacent inner wall of the body 19 is sealed by a tapered gasket or washer 24, preferably made of tin. In practice, the valve seat 23$^a$ and the washer or gasket 24 are conveniently formed by filling the cavity 23$^e$ as well as the entire space back of the body 23 with tin and then facing off with a lathe down to the brass of the body 23, except at the edge, where the tin is left in the form of the ring or washer 24 and serves as a solder for the block 23 to provide a gas-tight joint between the periphery of the same and the surrounding part of the body 19.

25 denotes a cone valve having its enlarged portion in the chamber 19$^a$, provided at the rear of the block 23, and adapted to engage the seat 23$^a$ at the outer or rear end of the bore 23$^c$. The valve is provided with a reduced stem 25$^a$, extending through the bore 23$^e$, through the chamber 22, and into the bore 20$^a$, where the stem is enlarged to engage the latter bore, as shown at 25$^b$.

26 denotes a head having a sleeve 26$^a$ which is threaded upon the projecting end of the part 25$^b$. A spiral spring 27 is interposed between the said head and the head 18, being seated in a groove 18$^a$ in the inner or front face of the latter head. The parts are so arranged that the spring 27 normally holds the valve 25 against the seat 23$^a$; and the length of the sleeve 26$^a$ is such that, when the head 26 is pushed in a direction to open the valve, the end of the sleeve will engage the adjacent face of the head 18 before the enlarged part 25$^b$ of the valve stem can close or materially obstruct the bore 23$^e$. Furthermore, by adjusting the head 26, the pressure exerted by the spring 27 between the valve 25 and its seat 23$^a$ may be varied. The outer end of the valve 25 is slotted, as shown at 25$^d$, to permit the application of a screw driver or other tool thereto, thereby to prevent the rotation of the valve stem during such adjustment of the head 26. It should be noted further that the capacity of the bore 23$^e$ and of the ports 25 is such that the full capacity of the valve may be realized by a short movement thereof—say about $\frac{1}{16}$th inch. Furthermore, the valve in practice cannot be moved more than $\frac{3}{16}$ths inch before the sleeve 26$^a$ engages the adjacent face of the head 18. The advantage of this will be pointed out in connection with the diaphragm.

Communicating with and projecting from the opposite side of the body section A' from the gages is a delivery connection 28 which is threaded into one of the bores 9 and to which suitable hose may be applied.

B denotes the opposite end cap section of the regulator, the same being provided with a reduced neck portion 30 having the extreme end of the cap portion 30$^a$ provided with a threaded aperture 30$^b$ for the reception of the threaded end of the adjusting plug 31. The inner end of this plug is tapered at 31$^a$ and engages a tapered seat 32$^a$ in a disk 32, said disk having a central projection 32 adapted to receive one end of a helical spring 33, the opposite end of which spring surrounds a boss 34$^a$ on a backing plate 34. The numeral 32 denotes the disk generally and the numeral 32$^a$ the central portion of the disk specifically. To keep the backing plate centered with respect to the spring 33 and the valve stem, I interpose between the end of the spring 33 and the said backing plate a guide plate having a central annular body 34$^b$ adapted to bear against the backing plate and having a central opening 34$^c$ for the boss 34$^a$ and radial guide arms 34$^d$ each having at its end a flange 34$^e$ adapted to bear against the cylindrical inner wall of the end cap B.

The diaphragm comprises a central portion 35, which is slightly bulged away from the valve body, said central portion corresponding to the internal diameter of the body of the end cap B. Surrounding such central portion is a short annular beveled portion 35$^a$ the outer portion of which merges with a flat annular portion 35$^b$ which is in a plane substantially parallel with the plane of the central portion 35. From the outer edge of the portion 35$^b$ there projects an annular flange 35$^c$ which is of a diameter to fit snugly about the adjacent portion of the body section A'.

The cap section B is provided with a tapered or beveled seat 36 for the beveled portion 35$^a$ of the diaphragm and with a flat seat 36$^a$ adapted to bear against the corresponding face of the portion 35$^b$. The seats 36 and 36$^a$ are shown as provided in a heavy annular flange 37 at the enlarged end of the cap section B. This flange in turn is so shaped as to provide a short end flange 37$^a$ which overhangs the flange 35$^c$ for a short distance, leaving the major portion of said flange uncovered and open to the atmosphere.

The end of the body section A' which cooperates with the flange 37 to seat the diaphragm is provided with a relatively narrow annular seat 38 adapted to receive the outer portion of the marginal seating portion 36$^a$ of the diaphragm. Between such portion and the seat 38 there is interposed a washer 39. This washer is of a material other than metal, to reduce the friction between the diaphragm and the seat 38. At present, the washer which I prefer to use is composed of paper saturated with glycerine, and the said washer is preferably fastened to the diaphragm, as by means of shellac. It will be noted that, when the regulator body sections are connected (by the means to be described hereinafter) the end of the flange 37$^a$ is substantially flush with the seat 38.

The parts A, A' and B of the regulator casing may be secured together in any desired manner, as by means of bolts extending through lugs (not shown) on the exteriors of the said parts.

Preferably adjacent to the flange 37, the section B is provided with openings 43 providing for the lateral free discharge of gas therethrough in the event that the diaphragm 35 should become ruptured by deterioration thereof or by the development of extremely high pressures within the chamber C.

With the parts constructed and arranged as described, the regulator will be placed in operation by opening the valve 2, after which the plug 31 will be adjusted to cause the central portion of the diaphragm to engage the head 26 to unseat the valve 25. The gas will be discharged into the regulator body and will be delivered through the connection 28, in the usual manner.

Should the pressure of the gas in the chamber C become excessive, it will bulge the diaphragm away from the valve seat 23$^b$, against the action of the spring 33, and allow the spring 27 to close the valve. Should the valve leak, or should the pressure in the chamber C become excessive—say, in excess of five hundred to six hundred pounds per square inch—the central portion of the diaphragm will be bulged upwardly, as indicated in Fig. 2. This will produce a pull upon the outer portion of the diaphragm, and the washer 39, being made of a material which will not oppose a high frictional resistance thereto, the said outer portion will be drawn inwardly, together with the washer 39, and the gas will escape under the marginal flange 35$^c$, such escape being facilitated by the rupture of the washer. This will provide a lateral escape for the gases without rupturing the diaphragm and without any danger of injuring the operators or those in the vicinity of the regulator.

Should the diaphragm happen to be ruptured, as through deterioration thereof or by the development of a sudden or extremely high pressure, the gases passing through said diaphragm will be discharged laterally through the opening 43, with like immunity from injury to the operators, etc.

The manner of constructing and supporting the diaphragm, the manner of connecting the sections A, A′ and B, the manner of connecting the body A, A′ with the tank connection, and the safety features generally are shown, described and claimed in my application Serial No. 27760 filed May 4, 1925 (now Patent 1,659,263, issued February 14, 1928) of which this application is a continuation in part. In this application, it should be noted that the manner of constructing the valve, indicated generally at 18, not only prevents leakage by reason of the use of the tin (or other soft metal) valve seat 23$^a$ and the packing washer or gasket 24, but cooperates with the structure of the back 8 to prevent freezing of the valve, especially where my regulator is used with gases which are dispensed in liquefied form, such as carbon dioxide, nitrous oxide, ethylene, and oxygen. The employment of a metal valve and mounting and a heavy back 8 enables heat-interchange to be effected quickly between the atmosphere on one side and the interior of the valve which is subjected to the low temperature caused by the expanding gases. By providing the radial openings 9, the surface of the back which is exposed to the atmosphere is correspondingly increased. As a result of my construction, my regulator is enabled to operate, without freezing, with gases which have hitherto been incapable of satisfactory regulation. Furthermore, I am enabled to accomplish this result in connection with a valve which will not leak.

Having thus described my invention, what I claim is:—

1. In a regulator, the combination of a body having a diaphragm extending thereacross to provide a chamber for the reception of gas, a valve for controlling the supply of gas to said chamber, the said valve comprising a mounting provided with a valve seat, a valve proper, and a valve stem projecting toward said diaphragm, an end cap for said body, a backing plate in said end cap and adapted to engage the central portion of the diaphragm, the said backing plate having a stem, a guide plate having an opening for said stem and mounted on the said backing plate and adapted to engage the inner surface of said cap, a spring surrounding the said stem and bearing at one end against the said guide plate, and means adjustably connected with the end of the cap which is opposite the said body for varying the pressure of the said spring against the said plate.

2. In a regulator, the combination of a body having a diaphragm extending thereacross to provide a chamber for the reception of gas, a valve for controlling the supply of gas to said chamber, the said valve comprising a mounting provided with a valve seat, a valve proper, and a valve stem projecting toward said diaphragm, an end cap for said body, a backing plate in said end cap and adapted to engage the central portion of the diaphragm, the said backing plate having a stem, a guide plate having an opening for said stem and mounted on the said backing plate and having projections adapted to engage the inner surface of said cap, a spring surrounding the said stem and bearing at one end against the said guide plate, and means adjustably connected with the end of the cap which is opposite the said body for varying the pressure of the said spring against the said plate.

3. In a regulator, the combination of a body having a diaphragm extending thereacross to provide a chamber for the reception of gas, a valve for controlling the supply of gas to said chamber, the said valve comprising a mounting provided with a valve seat, a valve proper, and a valve stem projecting toward said diaphragm, an end cap for said body, a backing plate in said end cap and adapted to engage the central portion of the diaphragm, the said backing plate having a stem, and a guide plate having an opening in the center thereof for said stem and an annular body surrounding said opening and engaging the backing plate, the guide plate having arms projecting from the annular body thereof, each arm having a flange adapted to engage the inner wall of the end cap, a helical spring having one end surrounding the said stem and bearing against the body of the guide plate, and means carried by the end of the cap which is opposite the first mentioned body for varying the pressure of the spring against the guide-plate body.

In testimony whereof, I hereunto affix my signature.

JOHN HARRIS.